J. PETRY.
DENTAL PLATE.
APPLICATION FILED JUNE 11, 1910.

990,000.

Patented Apr. 18, 1911.

WITNESSES.
J. R. Keller
Robt. C. Totten

INVENTOR.
Jacob Petry
By Ray & Totten
attorneys

UNITED STATES PATENT OFFICE.

JACOB PETRY, OF PITTSBURG, PENNSYLVANIA.

DENTAL PLATE.

990,000.  Specification of Letters Patent.  Patented Apr. 18, 1911.

Application filed June 11, 1910. Serial No. 566,362.

*To all whom it may concern:*

Be it known that I, JACOB PETRY, a resident of Pittsburg, in the county of Allegheny and State of Pennsylvania, have invented a new and useful Improvement in Dental Plates; and I do hereby declare the following to be a full, clear, and exact description thereof.

My invention relates to dental-plates and more especially to the manner of securing the suction-plate therein.

The object of my invention is to provide for the securing of the suction-plate in the dental-plate so that the same will be held securely therein with its outer edges held down beneath the over-hanging portions of the dental-plate formed by the depression to receive the suction-plate.

To these ends my invention consists, generally stated, in a suction-plate having a flexible metal reinforcement around its edges, so that the plate may be sprung sufficiently to insert it in the underlying recess formed in the dental-plate and when once inserted therein will be expanded sufficiently to prevent its slipping therefrom.

Figure 1:
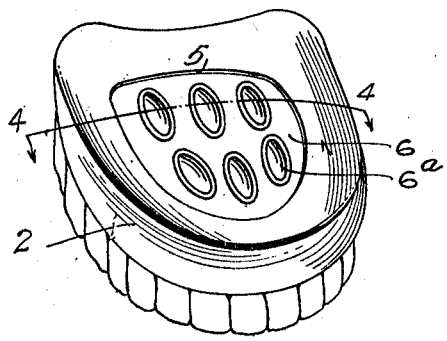
Figure 2:
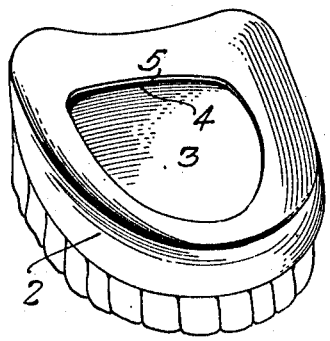
Figure 3:
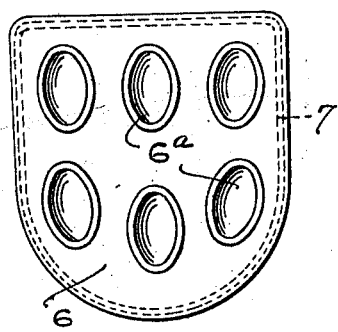
Figure 4:
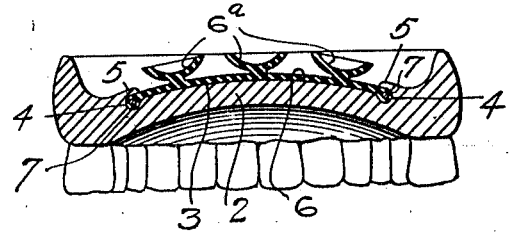
Figure 5:
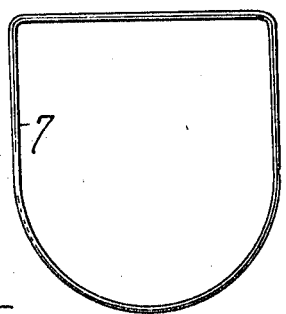
Figure 6:

In the accompanying drawings Figure 1 is a perspective view of my invention; Fig. 2 is a like view showing the suction-plate removed; Fig. 3 is a plan view of the suction plate; Fig. 4 is a section on the line 4—4 Fig. 1; Fig. 5 is a view of the resilient reinforcement removed; and Fig. 6 is an enlarged sectional view of the portion of the suction-plate showing the resilient reinforcement therein.

In the drawings the numeral 2 designates the dental-plate formed of vulcanized rubber in the ordinary manner and provided with the depression 3 which has the underlying recess or groove 4 formed by the over-hanging portions 5 of the plate. The suction-plate 6 is made of a flexible rubber with its suction-cups 6ᵃ integral therewith in accordance with a patent granted to me on the 5th day of July, 1910, No. 963,172.

The outer edge of the suction-plate 6 has the resilient reinforcement or wire 7 embedded therein, and this may be accomplished by turning the outer edge of the suction-plate over to surround the wire 7 and then vulcanizing the rubber at the edge so as to completely embed the wire 7 therein. This wire 7 may be formed of suitable metal having the necessary resiliency and strength. The suction-plate formed in this manner may be readily inserted in the recess 3 of the dental-plate, and by compressing the reinforcement 7 the suction-plate may be inserted with its edges in the underlying recess 4 of the dental-plate and when once inserted therein the resiliency of the reinforcement will act to hold the suction-plate within the recess 4 and prevent its slipping therefrom. To further insure the retention of the suction-plate, I prefer, however, to cement the suction-plate to the dental-plate.

The edges of the suction-plate are thus held down within the recess 4 of the dental-plate and there is no liability of the edges of the suction-plate slipping out or working loose. The wire reinforcement 7 will hold the edges of the suction-plate snugly in the recess 4, but if it is desired to remove the same for any reason by inserting the pointed instrument underneath the over-hanging portion 5 of the dental plate the edges of the suction-plate may be released and the suction-plate withdrawn. The reinforcement wire when once embedded in the suction-plate will not be exposed in any way to moisture and there is no danger of difficulty from corrosion of the metal.

What I claim is:

1. A dental-plate having a depression and a recess formed by the over-hanging portions of said plate surrounding said depression, a suction-plate, and a resilient metal reinforcement around the edge of said suction plate and fitting in such recessed portion of said dental-plate.

2. A dental-plate having a depression and a recess formed by the over-hanging portions of said plate surrounding said depression, a suction-plate, and a wire embedded in the outer edge of the suction-plate adapted to engage the recessed portion of said dental-plate.

In testimony whereof I the said JACOB PETRY have hereunto set my hand.

JACOB PETRY.

Witnesses:
ROBERT C. TOTTEN,
JOHN F. WILL.